3,496,556
MAGNETIC MEMORY

Arthur E. Wennstrom, Los Angeles, Calif., assignor to Hughes Aircraft Company, Culver City, Calif., a corporation of Delaware Filed Aug. 31, 1965, Ser. No. 484,003
Int. Cl. G11b *5/00*
U.S. Cl. 340—174 5 Claims

ABSTRACT OF THE DISCLOSURE

A magnetic memory including a plurality of cores, each including a bar portion which is detachably mounted across the mouth of a C-shaped portion to form a closed magnetic path; a plurality of conductors which are selectively threaded to pass through and to bypass the cores; a drive winding for inducing output signals in the conductors threaded through the cores and negligible signals on the bypass conductors for producing bit signals on each conductor; and wherein the plurality of conductors are connected in common circuit relationship at one end to form groups of conductors which can be selected one at a time.

This invention relates generally to magnetic memories and relates more particularly to improvements in a fixed (read only) magnetic core memory transformer.

Where the same digital information is to be used over and over again, it is desirable to have a permanent memory in which stored information need not be altered and is not destroyed by read operations. One technique that can be utilized to attain these performance requisites is the prewired or woven wire transformer core memory. In these memories, the stored information is determined by the manner in which wires are physically placed in relation to individual magnetic transformer cores. In other words, a binary ONE store would be attained at each memory core that has an information wire woven to pass through it, and a binary ZERO store would be attained at a momory core that is bypassed by the information wire.

It is an object of this invention to provide improvements in a woven fixed memory of the above type in which information can be stored in and erased from a memory array only through a structural altering of the memory.

A related object of this invention is to provide a woven wire, fixed memory in which digital information can be stored in and erased from the memory array in a simple manner.

Another object is to provide a woven wire fixed memory of the above type which has a high word capacity and a high information bit capacity relative to the number of magnetic cores contained in the memory array.

Still another object is to provide a woven wire, fixed memory which is easy to manufacture, is easy to repair, and is rugged, reliable and simple.

Other objectives of this invention are attained by providing an arrangement having a plurality of memory elements. Each memory element includes a closed loop magnetic core with electrical conductors or information wires selectively threaded or woven to either pass through the core or to bypass the core. The resulting magnetic coupling between the wires and the magnetic core is such that the wires passing through the core have a different magnetic coupling than the wires which bypass the core. Each such magnetic coupling can be considered as a digital bit of information wherein a binary ONE is represented by a wire passing through a magnetic core and a binary ZERO is represented by a wire bypassing the core. A detection circuit associated with a particular information wire can be used to determine the magnetic coupling between the wire and the core. Since the physical relationship between the particular wire and the particular core is always the same, the associated magnetic couple or digital information is always the same and can be detected and read over and over again without error.

In order to prevent the magnetic coupling among the several information wires from giving rise to spurious signals which can be detected by the detection circuits, a diode loading circuit may be provided which short-circuits unselected cores and prevents them from operating as transformers.

Digital information is stored in or erased from a memory core by physically changing the woven wire pattern. In practice, the storage relationship between a particular wire and a particular magnetic core can be changed from a binary ONE to a binary ZERO by re-threading the wire from a passing through to a bypassing of the core. Such physical changes in the stored information can be readily accomplished by providing a magnetic core that has a removable portion or leg which, when removed, provides a path for either removing threaded wires from or threading wires through the core.

A memory array having a high word capacity and a high bit capacity is provided by combining a plurality of the above described magnetic cores. In operation, the woven information wires can be used as sense wires, wherein a drive winding associated with the selected magnetic core is used to induce voltage signals in those sense wires threaded through the driven core. In practice, an X–Y selection can be made of a particular drive winding associated with a particular core. The plurality $k \times m$ of sense wires can, in turn, be grouped into word groups, $k$ in number, each word having $m$ bits of information where the total number of stored words can equal $k \times n$ where $n$ equals the number of magentic core elements. Consequently, the word storage capacity and bit storage capacity is only limited by the physical dimensions of the woven wire and core and the ability to obtain sufficient magnetic coupling between threaded wires and a magnetic core. Hence, by electrically selecting only one word, hereinafter also referred to as a W selection, and making and X and a Y selection to select a particular magnetic core, it is possible to selectively read out one $m$-bit word at a time from the memory array.

Other objects, features, and advantages of this invention some of which are so identified, will become apparent upon reading the following detailed description of one embodiment and referring to the accompanying drawings in which.

Figure 3A:
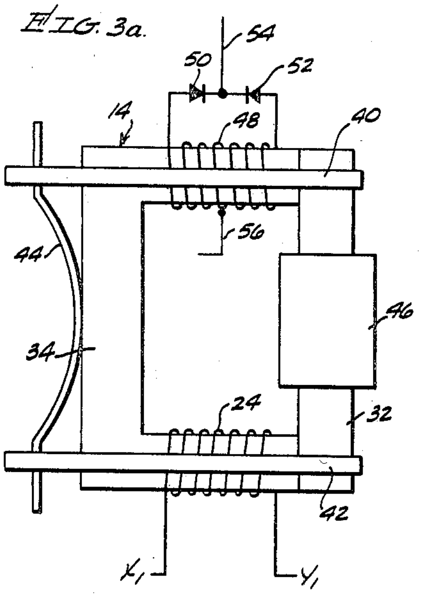
Figure 3B:
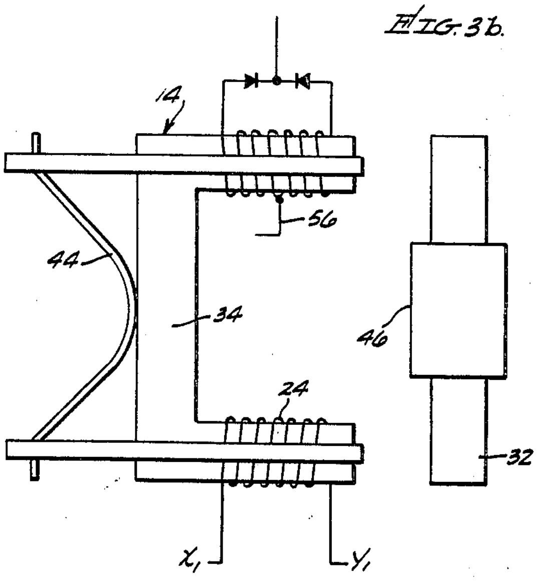
Figure 3C:
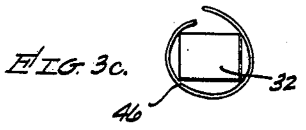
Figure 4:
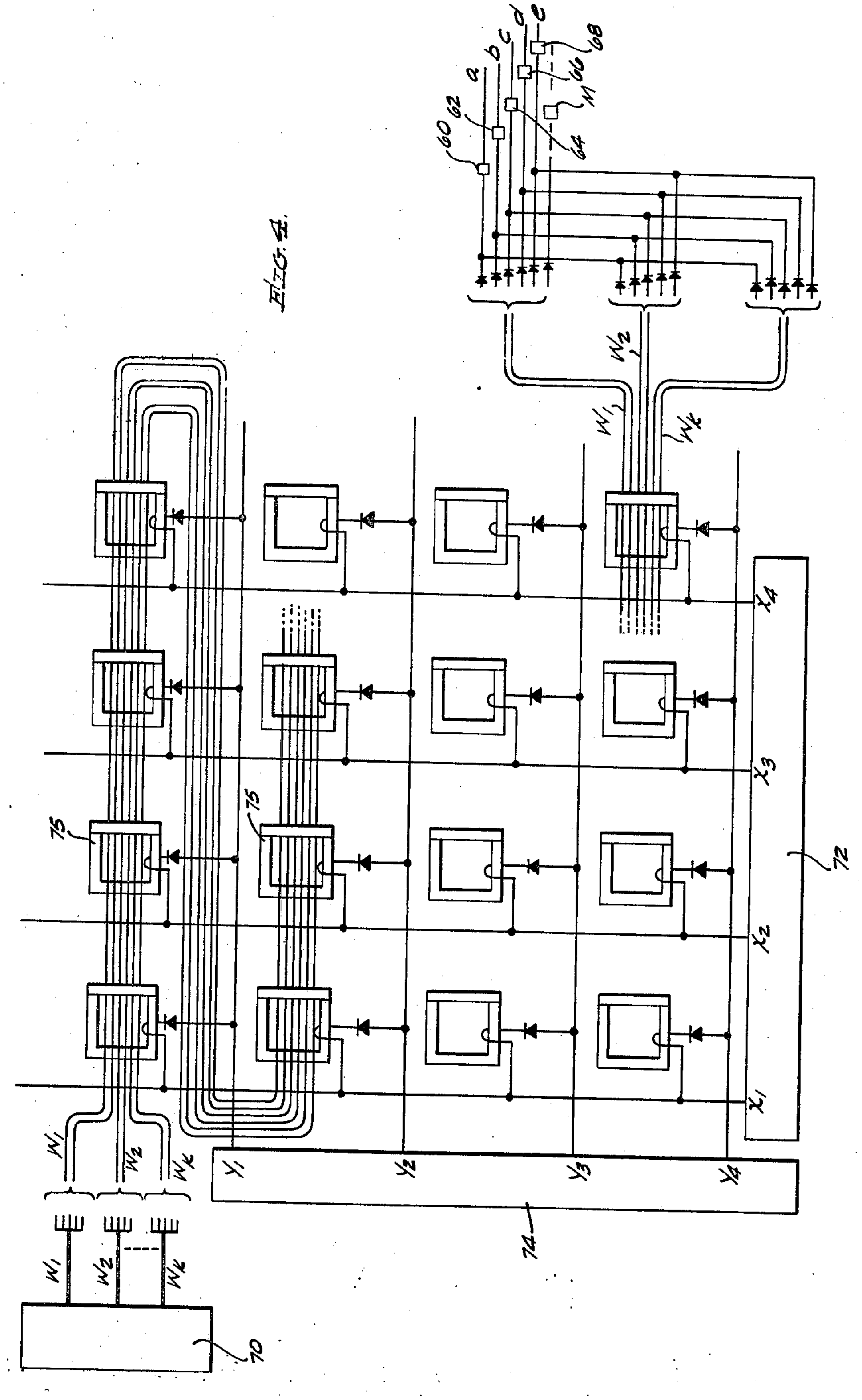

FIGS. 3*a*, 3*b* and 3*c* are axial views of a magnetic core showing one relationship of a loading circuit, a drive winding, and a means for fastening a removable section of the magnetic core to form a closed magnetic circuit; and FIG. 4 is a magnetic memory array which utilizes the above illustrated magnetic core circuits to provide a high storage capacity memory.

Figure 1:
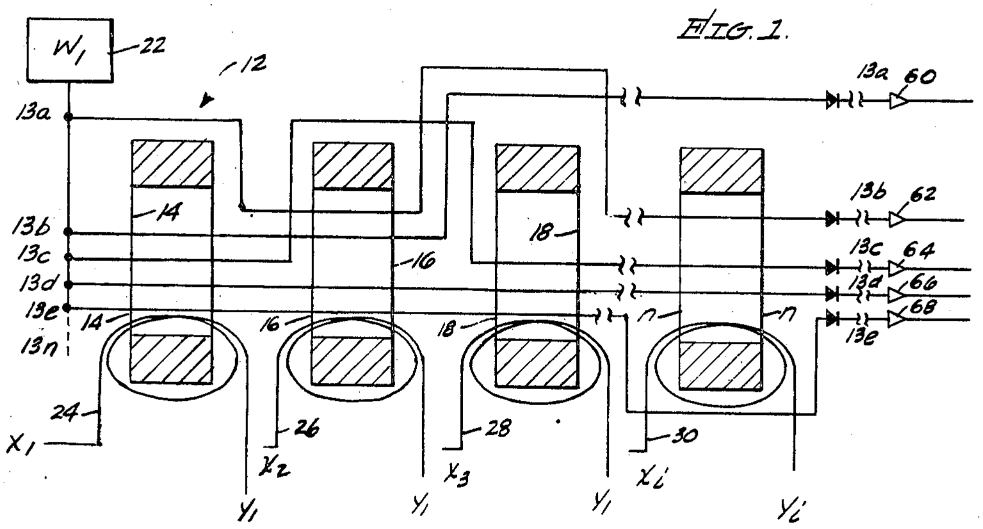
FIG. 1 is a cross-sectional schematic diagram of a magnetic memory illustrating a possible threading arrangement for one group of information wires relative to a plurality of magnetic cores.

Referring now to the magnetic memory circuit, FIG. 1 illustrates a group of electrical conductors such as the wires 12 which represent a group of digital words. The particular group of wires 12 includes a plurality of individual wires 13*a*–13*e* each of which is selectively woven or threaded to pass through or bypass each of a plurality of magnetic cores 14, 16, 18 and *n*, wherein the relationship between each wire and each magnetic core represents a digital bit of store information. The relationship between particular ones of the wires 13*a*–13*e* and particular ones of the particular cores 14–*n* is such that passage of a wire through a magnetic core can be arbitrarily considered to represent a digital ONE storage relationship, and a wire's bypassing or passing outside the magnetic core can be considered to represent a digital ZERO storage relationship. Since all of the individual wires 13*a*–13*e* are connected in common at one end by a selector means 22 such as an electrical switch, all of the wires 13*a*–13*e* associated with a particular magnetic core operate together and can be considered to represent a group of digital words.

An electrical voltage signal is induced in certain of the individual wires 13*a*–13*e* associated with a particular core by the operation of a certain selected one of the drive windings 24, 26, 28 and 30 associated with the respective magnetic cores 14–*n*. The operation of the drive winding 24 in inducing electrical voltage on the wires 13*a*–13*e* is more clearly illustrated in FIG. 2 where the magnetic core 14 is schematically illustrated in an axial view.

Figure 2:
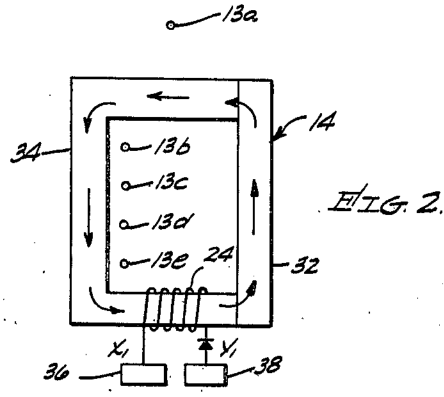
FIG. 2 is an axial view of one of the magnetic cores and the associated information wires schematically illustrating the magnetic coupling with a drive winding.

The memory element schematically illustrated in FIG. 2 includes a magnetic core 14 of ferrite material such as an efficient or nonrectangular hysteresis loop transformer ferrite. Structurally, the magnetic core 14 is formed in a closed magnetic circuit such as the rectangular path illustrated, or in any other conventional configuration, such as a toroid. The legs of the magnetic core 14 define an interior aperture through which individual word wires can be threaded or woven. As will be explained in more detail shortly, a removable section, or leg 32, of the magnetic core 14 can be separated from a C-shaped section 34 of the magnetic core to provide a passageway for easily laying the individual wires 13*b*–13*e* to pass through the aperture. It should of course be noted that the wires can also be removed through the same passageway.

A magnetic flux is generated in the closed magnetic circuit formed by the magnetic core 14 when the drive winding 24 is energized. Structurally, the drive winding 24 is coiled around a portion of one leg of the magnetic core 14 and has its two ends connected respectively to an X-selection switch 36 and a Y-selection switch 38 which can be an electrical switch means with a potential difference therebetween. In operation, with the switch means 36 and 38 closed, the resulting current which flows through the winding 24 generates a changing magnetic flux in the magnetic core 14. Changing this magnetic flux can, in effect, induce a voltage in the word wires 13*b*–13*e*.

The individual wires 13*a*–13*e* are arranged so that those wires 13*b*–13*e* which pass through the magnetic core aperture have a magnetic coupling with the magnetic circuit of the core 14, whereas, the wires that bypass the core and do not go through the core aperture have a negligible magnetic coupling with the magnetic circuit of the core. Structurally, the wires 13*a*–13*e* are efficient electrical conductors which are coated with an insulator. In practice, it would be possible to use thin copper wire with a Teflon coating which minimizes stray capacitance between adjacent wires. In operation, those wires 13*b*–13*e* which pass through the core aperture have a measurable voltage induced in them. The magnetic wire 13*a* which bypasses the magnetic core has negligible voltage induced in it. Hence, it is possible to determine whether the wires pass through the magnetic core or bypass the magnetic core by detecting the voltages induced on the individual wires 13*a*–13*e*.

Referring now to the details of the magnetic core, FIGS. 3*a*, 3*b*, and 3*c* illustrate the same magnetic core 14 in which the removable leg section 32 is attached and detached, respectively, from the C-shaped section 34, and whereupon the magnetic core 14 changes from a closed magnetic path configuration to an open magnetic path configuration.

The magnetic core, as illustrated in FIG. 3*a* has the leg 32 mechanically held against the C-shaped section 34 by means of a pair of spring-biased straps 40 and 42. Each strap 40 and 42 is a closed loop of some nonmagnetic material, such as copper, and is looped around the two legs of the C-shaped portion 34 and around the ends of removable leg 32. The removable leg 32 is spring-biased against the ends of the C-shaped portion 34 so that any mechanical gap between the sections is virtually eliminated or held very low by means of tension forces extended on the C-shaped member 34 through the strap members 40 and 42 by means of a bow-shaped leaf spring 44. The leaf spring 44 is supported under deflection by its back portion resting on the bight of the C-shaped section 34 and its ends hooked under the straps 40 and 42.

A sheath 46 of conducting material such as copper or aluminum is mounted around the removable leg 32. As illustrated in FIG. 3*c*, the sheath 46 is wrapped around the leg 32 in a somewhat convoluted manner so that the ends thereof are electrically insulated from one another and do not act as a shorted turn. This sheath 46 operates to tend to confine changes in magnetic flux to the leg 32 and to prevent flux leakage into the adjacent volume of space.

In FIG. 3*b*, the removable leg 32 has been detached from the C-shaped portion.

The drive windings 24 are wound around a portion of one leg of the magnetic core 14. For convenience, the lower leg of the C-shaped section has been wrapped by the turns of the drive winding 24. It should of course be understood that any one of the magnetic core legs or portions thereof could be wrapped with the drive winding 24. As previously stated, this drive winding 24 will generate a magnetic flux within the magnetic core 14 when $X_1$ and $Y_1$ selections are made.

To reduce the effective magnetic couplings among the information wires linking magnetic core 14, a diode loading circuit is connected to magnetic core 14. The effect of this loading circuit is, in the case where a core other than core 14 is selected, to reduce the tendency for a current flowing in any information wire linking core 14 to induce, by virtue of the magnetic coupling effect of core 14, voltages in other information wires linking core 14.

Structurally, the loading circuit includes a winding 48 which is coiled about a leg of the magnetic core 14. The ends of the winding 48 are connected respectively to the anodes of diodes 50 and 52. The cathodes of diodes 50 and 52 are connected to a common lead 54 which is at a predetermined voltage level. A DC current having a low level is applied to a center tap of the winding 48 by means of a lead 56 which is at a positive potential relative to the potential on lead 54. In effect, the loading circuit acts as a shorted turn to stop a nonselected magnetic core from acting like a transformer as a result of currents flowing in the word wires 13*a*–13*e* (FIG. 2). In operation, when a magnetic core 14 is selected and a magnetic flux is generated, one of the diodes 50 or 52 is back-biased as the rate of change of flux increases beyond a certain level. When, however, a low level flux is induced by the word wires 13*a*–13*e*, the rate of change of magnetic flux generated is not sufficient to back-bias either one of the diodes 50 or 52 and, as a result, the winding 48 acts as a shorted turn.

Referring back to FIG. 1, the ends of the electrical wires 13*a*–13*e* are connected to individual detector circuits 60, 62, 64, 66, and 68, wherein the current voltage induced in the wires 13*a*–13*e* by an X–Y selection is determined at the detectors and thereafter fed to a logic circuit. Thus, considering the memory circuit of FIG. 1 as a whole, in using the same symbology illustrated therein, it is possible to select a group of word wires $W_1$ by the selector switch 22. This group of word wire selections is hereinafter referred to as W-selections. By also making any X-selections, such as $X_1$, $X_2$, $X_3$ . . . $X_i$ in conjunction with a Y-selection, $Y_1$ . . . $Y_j$, it is possible to induce a changing magnetic flux in any one of the magnetic cores 14, 16, 18 . . . *n*.

In other words, by using four cores in conjunction with the wires **13*a*–13*e*, it is possible to read four words each having five bits of information from the word group $W_1$. For example: a selection $X_1$ and $Y_1$ will induce currents in the wires 13*a*–13*e* associated with core 14 so that the detectors 60–68** will detect the word 01111;

$X_2$, $Y_1$ selection will induce a current in the wires associated with core 16 so that a digital word 11011 is detected;

A selection $X_3$, $Y_1$ will induce a current in the wires associated with magnetic core 18 so that a digital word 00111 is read; and A selection $X_i$, $Y_j$ will induce a current in the wires associated with magnetic core *n* so that a digital word 10110 is detected.

It should be understood that the number of possible wires in the group of word wires 12 is not limited to five wires **13*a*–13*e***, but could be any number *m* of wires. Limitations resulting from the particular wire dimension, the aperture size, and the ability to provide magnetic coupling between the magnetic cores and the wires would be a practical limitation. In addition, it should also be understood that the groups of word wires 12 are not limited to one group $W_1$ but can include any number *k* of groups within the above mentioned physical limitations of the circuit. Consequently, the storage capacity of a memory array can be quite high.

A memory array having a high bit storage and word storage capacity that uses the above described memory element in accordance with the above described principles, is schematically illustrated in FIG. 4. For purposes of simplifying the diagram, the individual groups of word wires, such as the group of wires 12, illustrated in FIG. 1, have been illustrated as heavy cables which extend in a serpentine manner about all of the magnetic cores in the memory array. To further simplify the drawings, any bypass wires can be assumed to be hidden behind the associated heavy cable. In addition, the drive windings have been schematically illustrated as a single loop around one leg of the magnetic core rather than a plurality of turns and the loading windings 48 are not illustrated.

In operation, the memory array illustrated in FIG. 4 would be read on a word-by-word basis by three selection operations.

A particular one of the group of word wires $W_1$ . . . $W_k$ would be selected by a W-register 70 of any conventional type including electronic and electromechanical types. The W-register 70 causes to be completed an electrical circuit to each of the detectors 60, 62, 64, 66, 68 . . . *m* over the wires of the selected one of the group of word lines $W_1$ . . . $W_k$. Each individual wire in each of the groups of word lines $W_1$ . . . $W_k$ may be connected to a particular one of the detectors 60 . . . *m* and represents a particular digital place in the group of digital words. In effect, each detector circuit 60 . . . *m* has *k* possible connections to its input and thus may respond to the voltage signal induced in only one wire in each of the *k* groups of word lines, the response being determined by which of the groups $W_1$ . . . $W_k$ are selected.

In addition to the W-selection, a particular mganetic core is selected with an X-selection operation and a Y-selection operation by means of an X-register 72 and a Y-register 74. In operation, a signal on one of the output lines $X_1$ . . . $X_4$ from the X-register 72 coincident with an output signal on one of the output lines $Y_1$ . . . $Y_4$ from Y-register 74 will cause a current to flow through the drive winding of a particular magnetic core associated with the selected X–Y output. For example, an $X_2$ output and a $Y_2$ output will energize a magnetic flux in the magnetic core 75 and induce a current on the wires in a selected group of word wires such as $W_2$.

Certain desirable characteristics of magnetic material having a rectangular hysteresis loop may also be utilized to advantage in the above described embodiment if one or both of the sections 32 and 34 consist of such material and if, in addition, a current-carrying bias winding is provided linking each of the magnetic cores. The current in such bias winding should be sufficient to overcome the shearing effect of the small residual gaps between sections 32 and 34 on the flux-M.M.F. characteristic of the closed magnetic circuit and thereby will permit operation of the magnetic circuit in a region of low initial effective incremental permeability.

While salient features have been illustrated and described with respect to a particular embodiment, it should be readily apparent that modifications can be made within the spirit and scope of the invention, and it is therefore not desired to limit the invention ot the exact details shown and described.

What is claimed is:

1. A magnetic memory element comprising:

a closed magnetic path magnetic core means of magnetic material, said magnetic core means including a first section and a second section, said sections adapted to be separated from one another to form a passageway through the magnetic material;

means to mechanically fasten said first section to and operably release said first section from said second section;

information storage means including a plurality of electrically insulated conductors each adapted to be selectively passed through said magnetic core or to be not passed through said magnetic core whereby said conductors passed through said magnetic core can be placed therein through the passageway formed when said magnetic core sections are separated from one other;

a winding wound around a portion of the magnetic core material, said winding being magnetically coupled to any of the said conductors passed through said magnetic core and not being significantly magnetically coupled to any of the said conductors not passed through said magnetic core; and loading means including a winding on a portion of said magnetic core, the ends of said winding being coupled together through a switch means, said switch means being operably closed when the rate of change of flux within said core is small and open when the rate of change is sufficiently large.

2. A magnetic memory element comprising:

a closed magnetic path magnetic core means of magnetic material, said magnetic core means including a first section and a second section, said sections adapted to be separated from one another to form a passageway through the magnetic material;

means to mechanically fasten said first section to and operably release said first section from said second section;

information storage means including a plurality of electrically insulated conductors each adapted to be selectively passed through said magnetic core or to be not passed through said magnetic core whereby said conductors passed through said magnetic core can be placed therein through the passageway formed when said magnetic core sections are separated from one another;

a winding wound around a portion of the magnetic core material, said winding being magnetically coupled to any of the said conductors passed through said magnetic core and not being significantly magnetically coupled to any of the said conductors not passed through said magnetic core; and a shielding means including a sheet of conducting material extended around a portion of a section of said core means for reducing leakage coupled between conductors in said information storage means.

3. A magnetic memory element comprising:

a closed magnetic path magnetic core means of magnetic material, said magnetic core means including a first section and a second section, said sections adapted to be separated from one another to form a passageway through the magnetic material;

means to mechanically fasten said first section to and operably release said first section from said second section;

information storage means including a plurality of electrically insulated conductors each adapted to be selectively passed through said magnetic core or to be not passed through said magnetic core whereby said conductors passed through said magnetic core can be placed therein through the passageway formed when said magnetic core sections are separated from one another;

a winding wound around a portion of the magnetic core material, said winding being magnetically coupled to any of the said conductors passed through said magnetic core and not being significantly magnetically coupled to any of the said conductors not passed through said magnetic core;

loading means including a winding on a portion of said magnetic core, the ends of said winding being coupled together through a switch means, said switch means being operably closed when the rate of change of flux within said core is small and open when the rate of change is sufficiently large; and a shielding means including a sheet of conducting material extended around a portion of a section of said core means for reducing leakage coupled between conductors in said information storage means.

4. A magnetic memory element comprising:

a closed magnetic path magnetic core means of magnetic material, said magnetic core means including a first section and a second section, said sections adapted to be separated from one another to form a passageway through the magnetic material;

means to mechanically fasten said first section to and operably release said first section from said second section;

information storage means including a plurality of electrically insulated conductors each adapted to be selectively passed through said magnetic core or to be not passed through said magnetic core whereby said conductors passed through said magnetic core can be placed therein through the passageway formed when said magnetic core sections are separated from one another;

a drive winding wound around a portion of the maknetic core material, said winding being magnetically coupled to any of the said conductors passed through said magnetic core and not being significantly magnetically coupled to any of the said conductors not passed through said magnetic core;

loading means including a winding on a portion of said magnetic core, the ends of said winding being coupled together through a switch means, said switch means being operably closed when the rate of change of flux within said core is small and open when the rate of change is sufficiently large; and a shielding means including a sheet of conducting material extended around a portion of a section of said core means for reducing leakage coupled between conductors in said information storage means.

5. A magnetic memory comprising:

a plurality of magnetic core means of magnetic material, said core means forming a closed magnetic path;

information storage means including a plurality of electrically insulated conductors, each said conductor being adapted to be selectively passed through or to be not passed through each of said plurality of magnetic core means, said plurality of conductors being separated as groups, the individual wires of each group being connected in common circuit relationship at one portion thereof;

a plurality of drive windings, each said drive winding being wound around a portion of an individual one of said magnetic core means, said drive winding being magnetically coupled through the associated core to any of the said conductors passed through the said associated magnetic core;

circuit means including first means coupled to selectively connect one of said groups of conductors in circuit and second means coupled to selectively connect one of said drive windings in circuit for reading the storage information;

a plurality of loading means each including a winding, each said winding being coupled to a portion of an individual one of said magnetic cores, the ends of said winding being coupled together through a switch means, said switch means being operably closed when the rate of change of flux within said core is small and open when the rate of change is sufficiently large; and a plurality of shielding means each including a sheet of conducting material, each said conducting material extending around a portion of a section of a separate one of said core means for reducing leakage coupled between conductors in said informa tion storage means.

References Cited

UNITED STATES PATENTS

| | | | |
|---|---|---|---|
| 3,299,412 | 1/1967 | Pick | 340—173 |
| 2,973,508 | 2/1961 | Chadurjian | 340—174 |

OTHER REFERENCES

Publication I: IBM Technical Disclosure Bulletin, "Semi Permanent Memory," by Bruce, vol. 3, #10, March 1961; 340-174SPM; pp. 18 and 19.

STANLEY M. URYNOWICZ, Primary Examiner

U.S. Cl. X.R.

336—212